Patented May 23, 1950

2,508,917

UNITED STATES PATENT OFFICE 2,508,917

1-ALKOXY-1-ARYLOXY-2,2,3-TRICHLORO-N-BUTANES

Walter D. Harris, Naugatuck, Conn., and Theodore W. Kerr, Kingston, R. I., assignors to United States Rubber Company, New York, N. Y., a corporation of New Jersey No Drawing. Application January 29, 1947,
Serial No. 725,163

10 Claims. (Cl. 167—22)

1

This invention relates to improvements in insecticides. The term "insecticide" is considered to include larvaecides, arachnicides, and insect repellents or insectifuges, and is to be construed in accordance with the Insecticide Act of 1910, section 6.

We have found that mixed aliphatic-aromatic acetals of butyl chloral are effective insecticides. These are new chemicals which we have found to be toxic to a wide variety of insects, including the greenhouse red spider mite and the Mexican bean beetle, which insects are not effectively controlled by the known insecticide 2,2-bis (p-chlorophenyl)-1,1,1-trichlorethane (DDT). The mixed aliphatic-aromatic acetals of butyl chloral may be represented by the general formula:

in which X is an aliphatic radical and Y is an aromatic radical. Examples of the aliphatic radicals X are alkyl, cycloalkyl, haloalkyl, cyanoalkyl, alkoxyalkyl, hydroxyalkyl. Examples of the aromatic radicals Y are phenyl, naphthyl, halophenyl, nitrophenyl, alkylphenyl, alkoxyphenyl. The chemicals of the invention may also be classed as 1-alkoxy-1-aryloxy-2,2,3-trichloro-n-butanes, where the alkoxy group may be considered a hydrocarbon alkyl ether linkage or a substituted alkyl ether linkage (e. g. haloalkyl, cyanoalkyl, alkoxyalkyl or hydroxyalkyl ether linkage) and the aryloxy group may be considered a hydrocarbon aryl (e. g. phenyl or naphthyl) ether linkage, or a substituted aryl ether linkage (e. g. haloaryl, nitroaryl, alkaryl or alkoxyaryl ether linkage).

The compounds of the present invention are readily prepared by refluxing the selected phenolic compound with the selected aliphatic 1,2,2,3-tetrachloro-n-butyl ether. The reaction between the phenol and the chloroether proceeds smoothly and in good yields. No catalyst is necessary. In general, it is advisable to use an excess of the lower boiling component, so that the temperature may be controlled more readily. The mixture is refluxed, preferably under reduced pressure, from one to five hours. The reaction mixture can then be fractionated without washing, or if extreme purity is desired, unreacted phenol can be removed by washing with dilute aqueous alkali before distilling. Most of these materials are colorless to yellow, almost odorless liquids.

The chemicals of the present invention may be applied to loci to be protected against insects in undiluted form, or as dusts when admixed with or adsorbed on powdered solid carriers, such as clay or talc, or as liquids or sprays when in a liquid carrier, as in solution in a suitable solvent, or dispersed in a suitable non-solvent medium, for example, water. In protecting plants (the term including plant parts) which are subject to attack by insects, the mixed aliphatic-aromatic acetals of butyl chloral of the present invention are preferably applied as aqueous emulsions containing a dispersing agent. The chemicals may be used admixed with carriers that are active of themselves, for example, other insecticides, fungicides or bactericides. The mixed aliphatic-aromatic acetals of butyl chloral may also be used as intermediates in organic synthesis, and as high-boiling solvents.

The aliphatic 1,2,2,3-tetrachloro-n-butyl ethers used in the preparation of the mixed aliphatic-aromatic acetals of butyl chloral may be prepared as described in another application of the present inventors Serial No. 725,162, filed January 29, 1947, by adding the selected aliphatic alcohol to butyl chloral to form, quantitatively, the butyl chloral alcoholate and then converting the same by means of a halogenating agent, such as phosphorus pentachloride, to the aliphatic 1,2,2,3-tetrachloro-n-butyl ether with liberation of hydrogen chloride. The conversion of the alcoholate to the aliphatic 1,2,2,3-tetrachloro-n-butyl ether is conveniently carried out in an inert solvent, such as an ethyl ether, at room temperature or lower. The reaction of ethyl alcohol with butyl chloral followed by the chlorination with phosphorus pentachloride to give the ethyl-1,2,2,3-tetrachloro-n-butyl ether is shown in the reaction numbered I below. The reaction of the ethyl 1,2,2,3-tetrachloro-n-butyl ether with phenol to give the mixed ethyl-phenyl acetal of butyl chloral (1-ethoxy-1-phenoxy-2,2,3-trichloro-n-butane) is shown in the reaction numbered II below.

I

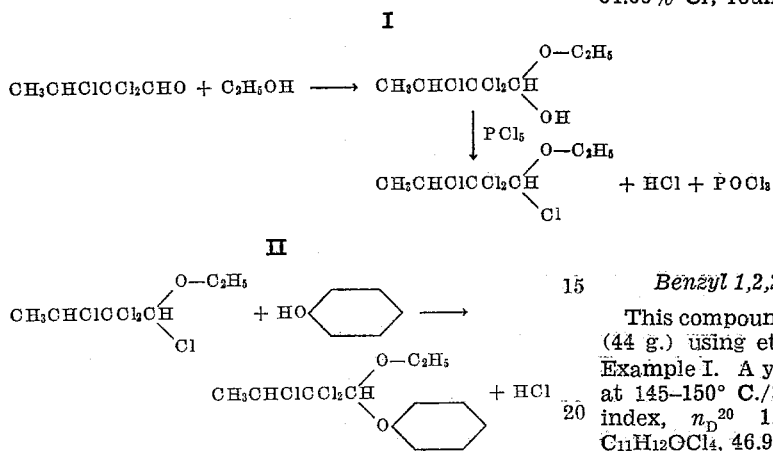

Detailed procedures for the preparation of various aliphatic 1,2,2,3-tetrachloro-n-butyl ethers from which may be prepared the mixed aliphatic-aromatic acetals of butyl chloral of the present invention are described in Examples I to VI below.

EXAMPLE I

*Ethyl 1,2,2,3-tetrachloro-n-butyl ether*

One gram mole (46 g.) of anhydrous ethyl alcohol was added slowly with thorough agitation to 1 mole (175.5 g.) of butyl chloral. The solution warmed rapidly as the alcohol was added. The clear colorless alcoholate was allowed to cool, then dissolved in 100 cc. of dry ethyl ether. This solution was added slowly, with stirring and cooling in an ice water bath, to 210 g. of phosphorus pentachloride in 100 cc. of dry ethyl ether. The solution was added at such a rate that the temperature of the reaction mixture did not climb much above 20° C. As soon as addition was complete, the cooling bath was removed and stirring was continued for another hour. The ether solution was poured into two or three volumes of ice water and was stirred vigorously for one hour. The oil layer was separated and washed with dilute aqueous alkali until the wash water gave a slightly basic reaction and finally with water. The ether was removed on the steam bath and the product was distilled rapidly under reduced pressure. A yield of 180 g. of water white liquid boiling at 84–86° C./4 mm. was obtained. Refractive index, $n_D^{20}$ 1.4869. Analysis calculated for $C_6H_{10}OCl_4$, 59.12% Cl; found 58.87% Cl.

EXAMPLE II

*Isobutyl 1,2,2,3-tetrachloro-n-butyl ether*

This compound was prepared from isobutyl alcohol (18.5 g.), butyl chloral (44 g.), phosphorus pentachloride (54 g.) using ether as a solvent, as described in Example I. A yield of 37 g. of water white liquid boiling at 85–92° C./2.2 mm. was obtained. Refractive index, $n_D^{20}$ 1.4782. Analysis calculated for $C_8H_{14}OCl_4$, 52.92% Cl; found 52.85% Cl.

EXAMPLE III

*β-chloroethyl 1,2,2,3-tetrachloro-n-butyl ether*

This compound was prepared from anhydrous ethylene chlorohydrin (20 g.), butyl chloral (44 g.) and phosphorus pentachloride (54 g.) using ether as a solvent as in Example I. A yield of 44 g. of almost water white liquid boiling at 80–108° C./2.5 mm. was obtained. Refractive index, $n_D^{20}$ 1.5050. Analysis calculated as $C_6H_9OCl_3$, 64.60% Cl; found 64.69% Cl.

EXAMPLE IV

*Benzyl 1,2,2,3-tetrachloro-n-butyl ether*

This compound was prepared from butyl chloral (44 g.) using ether as a solvent, as described in Example I. A yield of 43 g. of colorless oil boiling at 145–150° C./3 mm. was obtained. Refractive index, $n_D^{20}$ 1.5426. Analysis calculated as $C_{11}H_{12}OCl_4$, 46.96% Cl; found 47.23% Cl.

EXAMPLE V

*Allyl 1,2,2,3-tetrachloro-n-butyl ether*

This compound was prepared from allyl alcohol (14.5 g.), butyl chloral (44 g.) and phosphorus pentachloride (50 g.) using ether as a solvent, as described in Example I. A yield of 33 g. of a water white oil boiling at 78–81° C./2.5 mm. was obtained. Refractive index, $n_D^{20}$ 1.4958. Analysis calculated as $C_7H_{10}OCl_4$, 56.29% Cl; found 56.85% Cl.

EXAMPLE VI

*Cyclohexyl 1,2,2,3-tetrachloro-n-butyl ether*

This compound was prepared from cyclohexanol (25 g.), butyl chloral (44 g.) and phosphorus pentachloride (55 g.) using ether as a solvent, as described in Example I. A yield of 35 g. of a water white oil boiling at 118–121° C./2.2 mm. was obtained. Refractive index, $n_D^{20}$ 1.5061. Analysis calculated as $C_{10}H_{16}OCl_4$, 48.23% Cl; found 48.37% Cl.

A wide variety of aliphatic alcohols may be employed to give the desired aliphatic 1,2,2,3-tetrachloro-n-butyl ether. Examples of aliphatic radicals in the aliphatic ether linkage are alkyl (e. g., methyl, ethyl, n-propyl, isopropyl, n-butyl, sec. butyl, n-amyl, isoamyl, heptyl, octyl, dodecyl), cycloalkyl (e. g., cyclohexyl), aralkyl (e. g., benzyl), alkenyl (e. g., allyl, methallyl), and substituted alkyl groups, such as haloalkyl, cyanoalkyl, alkoxyalkyl, hydroxyalkyl and aryloxyalkyl (e. g., β-chloroethyl, β-cyanoethyl, γ-chloropropyl, β-p-chlorophenoxy-ethyl). Thus, further compounds illustrative of the invention are:

β-cyanoethyl 1,2,2,3-tetrachloro-n-butyl ether
β-thiocyanoethyl 1,2,2,3-tetrachloro-n-butyl ether
β-p-chlorophenoxy-ethyl 1,2,2,3 - tetrachloro-n-butylether.

Detailed procedures for the preparation of various mixed aliphatic-aromatic acetals of butyl choral of the present invention from various aliphatic 1,2,2,3-tetrachloro-n-butyl ethers prepared as shown in Examples I to VI, are described in Examples VII to XIV.

EXAMPLE VII

*1-ethoxy-1-phenoxy-2,2,3-trichloro-n-butane*

A solution of 28 grams of ethyl 1,2,2,3-tetrachloro-n-butyl ether and 9.4 grams of phenol was refluxed under reduced pressure (100 mm.) for 5 hours. The pressure was reduced to 1 mm. of mercury and the reaction mixture was fractionated. A yield of 12.6 g. of a yellow oily liquid which boiled at 110–120° C./1 mm. was obtained. Refractive index, $n_D^{20}$, 1.5221. Analysis calculated for $C_{12}H_{15}O_2Cl_3$, 35.74% Cl; found 35.70% Cl.

EXAMPLE VIII

*1-ethoxy-1-(p-chlorophenoxy)-2,2,3-trichloro-n-butane*

A solution of 35 grams of ethyl 1,2,2,3-tetrachloro-n-butyl ether and 12.9 grams of p-chlorophenol was refluxed under reduced pressure (about 100 mm.) for about three hours. The dark colored reaction mixture was fractionally distilled under reduced pressure. A yield of 26.6 grams of light yellow oil boiling at 155–158° C./3 mm. was obtained. This product, when redistilled, was a very pale straw colored, almost odorless liquid, boiling point 148–150° C./2 mm. Refractive index, $n_D^{20}$ 1.5327. Analysis calculated for $C_{12}H_{14}O_2Cl_4$, 42.71% Cl; found 42.5% Cl.

EXAMPLE IX

*1-ethoxy-1-(2,4-dichlorophenoxy)-2,2,3-trichloro-n-butane*

A solution of 35 g. of ethyl 1,2,2,3-tetrachloro-n-butyl ether and 16.4 g. of 2,4-dichlorophenol was refluxed seventy-five minutes under about 100 mm. pressure. The reaction mixture was fractionated under reduced pressure, yielding 23 g. of a pale yellow oil which boiled at 163–164° C./2 mm. Refractive index, $n_D^{20}$ 1.5415. Analysis calculated for $C_{12}H_{13}O_2Cl_5$, 48.37% Cl; found 47.6% Cl.

EXAMPLE X

*1-ethoxy-1-(2,4,5-trichlorophenoxy)-2,2,3-trichloro-n-butane*

A solution of 28 g. of ethyl 1,2,2,3-tetrachloro-n-butyl ether and 19.7 g. of 2,4,5-trichlorophenol was refluxed for five hours under about 100 mm. pressure. The reaction mixture was fractionated under reduced pressure, yielding 21 g. of a yellow viscous oil which boiled at 155–165° C./1 mm. Refractive index, $n_D^{20}$ 1.5512. Analysis calculated for $C_{12}H_{12}O_2Cl_6$, 53.06% Cl; found 52.90% Cl.

EXAMPLE XI

*1-β-chloroethoxy-1-p-chlorophenoxy-2,2,3-trichloro-n-butane*

A solution of 10 g. of β-chloroethyl 1,2,2,3-tetrachloro-n-butyl ether and 10 g. of p-chlorophenol was heated for four and one-half hours under about 100 mm. pressure. The reaction mixture was fractionated under reduced pressure, yielding 10.5 g. of light yellow oil which boiled at 160–172° C./1.9 mm. Refractive index, $n_D^{20}$ 1.5438. Analysis calculated for $C_{12}H_{13}O_2Cl_5$, 48.37% Cl; found 47.32% Cl.

EXAMPLE XII

*1-isobutoxy-1-p-chlorophenoxy-2,2,3-trichloro-n-butane*

A solution of 10 g. each of isobutoxy 1,2,2,3-tetrachloro-n-butyl ether and p-chlorophenol was refluxed under a pressure of about 100 mm. for five hours. Fractionation of the reaction mixture yielded 12 g. of almost water white oil which boiled at 159–164° C./2.2 mm. Refractive index, $n_D^{20}$ 1.5227. Analysis calculated for $C_{14}H_{18}O_2Cl_4$, 39.39% Cl; found 39.0% Cl.

EXAMPLE XIII

*1-allyloxy-1-p-chlorophenoxy-2,2,3-trichloro-n-butane*

A solution of 10 g. each of allyl 1,2,2,3-tetrachloro-n-butyl ether and p-chlorophenol was refluxed under a pressure of approximately 100 mm. for three and one-half hours. Fractionation of the reaction mixture yielded 6 g. of a yellow oil which boiled at 150–153° C./2 mm.

EXAMPLE XIV

*1-cyclohexyloxy-1-p-chlorophenoxy-2,2,3-trichloro-n-butane*

A solution of 10 g. each of cyclohexyl 1,2,2,3-tetrachloro-n-butyl ether and p-chlorophenol was refluxed under a pressure of approximately 100 mm. for three and one-half hours. Fractionation of the reaction mixture yielded 3.3 g. of a viscous yellow oil which boiled at 150–170° C./1 mm.

Examples of other aliphatic groups in the alkyl ether linkage in the general formula for the mixed aliphatic-aromatic acetals of butyl chloral are: methyl, n-propyl, isopropyl, isobutyl, sec.-butyl, n-amyl, iso-amyl, 2-methyl butyl, n-heptyl, n-dodecyl, β-hydroxyethyl, β-ethoxy-ethyl, β-bromo-ethyl, α-chloropropyl, β-cyano-ethyl. Examples of other aromatic groups in the aryl ether linkage in the general formula are pentachlorophenyl, 2,4,6-trichlorophenyl, p-tolyl, p-anisyl, p-fluorophenyl, p-nitrophenyl. Thus, further compounds illustrative of the present invention are:

1-β-chloro-ethoxy-1-p-chlorophenoxy-2,2,3-trichloro-n-butane

1-β-cyano-ethoxy-1-p-chlorophenoxy-2,2,3-trichloro-n-butane 1-cyclohexyloxy-1-(p-tert-butyl phenoxy)-2,2,3-trichloro-n-butane 1-methoxy-1-p-fluorophenoxy-2,2,3-trichloro-n-butane 1-ethoxy-1-(p-tolyloxy)-2,2,3-trichloro-n-butane 1-ethoxy-1-(p-methoxy-phenoxy)-2,2,3-trichloro-n-butane 1-ethoxy-1-(p-nitrophenoxy)-2,2,3-trichloro-n-butane 1-ethoxy-1-(β-naphthoxy)-2,2,3-trichloro-n-butane.

The following examples illustrate the effectiveness of various mixed aliphatic-aromatic acetals of butyl chloral as insecticides:

EXAMPLE A

Pinto bean leaves were sprayed with 1% aqueous emulsions of various aliphatic mixed aliphatic-aromatic acetals of butyl chloral, the emulsions containing small amounts of commercial dispersing agents (Emulfor EL which is a reaction product of alkylene oxide and castor oil, and Nacconal which is an alkyl aryl sulfonate) which were known to be non-toxic to the organisms under test. The bean leaves were then infested with approximately 40 Mexican bean beetles (*Epilachna varivestis*) in four replicates of each treatment. The bean leaves were placed in separate covered petri dishes. After 48 hours observations disclosed mortalities of the beetles on the leaves treated with the various mixed aliphatic-aromatic acetals of butyl chloral, as shown in the following table. In untreated leaves there was no mortality of the beetles.

| Chemical | Per Cent Mortality |
|---|---|
| 1-Ethoxy-1-phenoxy-2,2,3-trichloro-n-butane | 100.0 |
| 1-Ethoxy-1-(p-chlorophenoxy)-2,2,3-trichloro-n-butane | 100.0 |
| 1-Ethoxy-1-(2,4-dichlorophenoxy)-2,2,3-trichloro-n-butane | 97.5 |
| 1-Ethoxy-1-(2,4,5-trichlorophenoxy)-2,2,3-trichloro-n-butane | 92.5 |
| 1-β-chloroethoxy-1-(p-chlorophenoxy)-2,2,3-trichloro-n-butane | 92.5 |
| 1-Isobutoxy-1-(p-chlorophenoxy)-2,2,3-trichloro-n-butane | 100.0 |
| 1-Allyloxy-1-(p-chlorophenoxy)-2,2,3-trichloro-n-butane | 82.5 |
| 1-Cyclohexyloxy-1-(p-chlorophenoxy)-2,2,3-trichloro-n-butane | 100.0 |

EXAMPLE B

Leaves of the broad bean (*Vicia faba*) infested with pea aphids (*Macrosiphum pisi*) were sprayed with 1% aqueous emulsions of various mixed aliphatic aromatic acetals of butyl chloral, the emulsions containing small amounts of Emulfor EL and Nacconal NR which were known to be non-toxic to the organisms under test. There were a variable number of insects in four replicates of each treatment. Observations were made after 24 hours to disclose the kill of aphids. The per cent mortality and the number of pea aphids on the leaves treated with the various mixed aliphatic-aromatic acetals of butyl chloral are shown in the following table. In the untreated (check) leaves infested with 192 aphids, the mortality was 1.8%.

| Chemical | No. of Aphids | Per cent Mortality |
|---|---|---|
| 1-Ethoxy-1-phenoxy-2,2,3-trichloro-n-butane | 139 | 87.1 |
| 1-Ethoxy-1-(p-chlorophenoxy)-2,2,3-trichloro-n-butane | 184 | 92.4 |
| 1-Ethoxy-1-(2,4-dichlorophenoxy)-2,2,3-trichloro-n-butane | 156 | 94.9 |
| 1-Ethoxy-1-(2,4,5-trichlorophenoxy)-2,2,3-trichloro-n-butane | 205 | 63.9 |
| 1-β-chloroethoxy-1-(p-chlorophenoxy)-2,2,3-trichloro-n-butane | 216 | 58.8 |
| 1-Isobutoxy-1-(p-chlorophenoxy)-2,2,3-trichloro-n-butane | 194 | 80.9 |
| 1-Allyloxy-1-(p-chlorophenoxy)-2,2,3-trichloro-n-butane | 170 | 62.4 |
| 1-Cyclohexyloxy-1-(p-chlorophenoxy)-2,2,3-trichloro-n-butane | 155 | 73.5 |

EXAMPLE C

Pinto bean leaves infested with red spider mites (*Tetranychus telarius*) were sprayed with 1% aqueous emulsions of various mixed aliphatic-aromatic acetals of butyl chloral, the emulsions containing small amounts of Emulfor EL and Nacconal NR which were known to be non-toxic to the organisms under test. There were variable numbers of mites in four replicates of each treatment. Observations were made after 24 hours to disclose the kill of mites. The per cent mortality and number of mites on the leaves treated with the various mixed aliphatic-aromatic acetals of butyl chloral are shown in the table below. In untreated (check) leaves infested with 210 red spider mites, the mortality was 3.4% after 24 hours.

| Chemical | No. of Mites | Percent Mortality |
|---|---|---|
| 1-Ethoxy-1-phenoxy-2,2,3-trichlorobutane | 124 | 99.2 |
| 1-Ethoxy-1-(p-chlorophenoxy)-2,2,3-trichloro-n-butane | 195 | 98.5 |
| 1-Ethoxy-1-(2,4-dichlorophenoxy)-2,2,3-trichloro-n-butane | 212 | 100.0 |
| 1-Ethoxy-1-(2,4,5-trichlorophenoxy)-2,2,3-trichlorobutane | 164 | 86.0 |
| 1-β-chloroethoxy-1-(p-chlorophenoxy)-2,2,3-trichloro-n-butane | 187 | 85.0 |
| 1-Isobutoxy-1-(p-chlorophenoxy)-2,2,3-trichloro-n-butane | 143 | 98.6 |
| 1-Cyclohexyloxy-1-(p-chlorophenoxy)-2,2,3-trichloro-n-butane | 323 | 93.8 |

Having thus described our invention, what we claim and desire to protect by Letters Patent is:

1. A 1-alkoxy-1-aryloxy-2,2,3-trichloro-n-butane.
2. An insecticidal composition comprising 1-alkoxy-1-phenoxy-2,2,3-trichloro-n-butane.
3. A 1-alkoxy-1-chlorophenoxy-2,2,3-trichloro-n-butane.
4. A 1-ethoxy-1-aryloxy-2,2,3-trichloro-n-butane.
5. 1-ethoxy-1-phenoxy-2,2,3-trichloro-n-butane.
6. A 1-ethoxy-1-chlorophenoxy-2,2,3-trichloro-n-butane.
7. 1-ethoxy-1-(p-chlorophenoxy)-2,2,3-trichloro-n-butane.
8. 1-ethoxy-1-(2,4-dichlorophenoxy)-2,2,3-trichloro-n-butane.
9. An insecticidal composition comprising a 1-alkoxy-1-phenoxy-2,2,3-trichloro-n-butane and a powdered solid carrier therefor.
10. An insecticidal composition comprising a 1-alkoxy-1-phenoxy-2,2,3-trichloro-n-butane, said aqueous emulsion containing a dispersing agent.

WALTER D. HARRIS.
THEODORE W. KERR.

REFERENCES CITED

The following references are of record in the file of this patent:

UNITED STATES PATENTS

| Number | Name | Date |
|---|---|---|
| 2,129,025 | Rieche et al. | Sept. 6, 1938 |
| 2,209,911 | Bruson et al. | July 30, 1940 |
| 2,314,304 | Britton | Mar. 16, 1943 |
| 2,327,338 | Carswell | Aug. 24, 1943 |
| 2,416,263 | MacMullen | Feb. 18, 1947 |
| 2,425,534 | Hester et al. | Aug. 12, 1947 |

OTHER REFERENCES

Beilstein, vol. 1, page 665.